US008798982B2

(12) United States Patent
Maeno

(10) Patent No.: US 8,798,982 B2
(45) Date of Patent: Aug. 5, 2014

(54) INFORMATION PROCESSING DEVICE, INFORMATION PROCESSING METHOD, AND PROGRAM

(75) Inventor: Yoshiharu Maeno, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/980,000

(22) PCT Filed: Aug. 20, 2012

(86) PCT No.: PCT/JP2012/005208
§ 371 (c)(1),
(2), (4) Date: Jul. 16, 2013

(87) PCT Pub. No.: WO2013/031129
PCT Pub. Date: Mar. 7, 2013

(65) Prior Publication Data
US 2013/0297283 A1    Nov. 7, 2013

(30) Foreign Application Priority Data

Aug. 30, 2011  (JP) ................................ 2011-187453

(51) Int. Cl.
G06F 9/44     (2006.01)
G06F 21/60    (2013.01)
G06F 21/62    (2013.01)
G06F 21/72    (2013.01)

(52) U.S. Cl.
CPC ............ G06F 21/604 (2013.01); G06F 21/629 (2013.01); G06F 21/72 (2013.01)
USPC .......................................................... 703/21

(58) Field of Classification Search
CPC ..... G06F 21/604; G06F 21/629; G06F 21/72; H04L 51/08
USPC .......................................................... 703/21
See application file for complete search history.

(56) References Cited

U.S. PATENT DOCUMENTS

2007/0043860 A1* 2/2007 Pabari ........................... 709/224
2007/0179955 A1* 8/2007 Croft et al. ....................... 707/9
2009/0241108 A1* 9/2009 Edwards et al. ................. 718/1

FOREIGN PATENT DOCUMENTS

JP    8-115207 A    5/1996
JP    2005-80104 A    3/2005

(Continued)

OTHER PUBLICATIONS

Nobukatsu Todo (Toudou), et al., "A Study of Availability Measurement on Networked System", Computer Security Symposium 2008 Ronbunshu, [separate vol. 2], Oct. 8, 2008, pp. 563-568. Concise English language explanation provided in ISR.

(Continued)

Primary Examiner — Dwin M Craig
(74) Attorney, Agent, or Firm — Sughrue Mion, PLLC

(57) ABSTRACT

A configuration storage unit (110) stores the constituent element identification information of each constituent element, in association with the type information indicating the type of the constituent element, the constituent element identification information of another constituent element related to the constituent element, and the type information of the another constituent element. For each piece of the type information, a rule storage unit (120) stores the type information of another constituent element, which is influenced when failures occur in the constituent element corresponding to the type information, in association with influence information indicating a content of the influence. An availability model generation unit (130) generates an availability prediction model for an information processing system, on the basis of the information stored in the configuration storage unit (110) and the information stored in the rule storage unit (120).

9 Claims, 11 Drawing Sheets

(56) References Cited

FOREIGN PATENT DOCUMENTS

| | | |
|---|---|---|
| JP | 2006-127464 A | 5/2006 |
| JP | 2007-509404 A | 4/2007 |
| JP | 2008-532170 A | 8/2008 |
| JP | 2009-199534 A | 9/2009 |
| JP | 2011-22774 A | 2/2011 |

OTHER PUBLICATIONS

Fumio Machida, "Cloud to Analytics", Operations Research as a Management Science Research, vol. 56, No. 6, Jun. 1, 2011, pp. 311-317. Concise English language explanation provided in ISR.

Takehiko Hosokawa et al., "Subjects and Solutions on Business Impact Analysis using Common Information Model", IPSJ SIG Notes, vol. 2005, No. 33, Mar. 23, 2005, pp. 277-282. Concise English language explanation provided in ISR.

Kumiko Tadano et al., "Activity Diagram de Kijutsu sareta System Un'yo Sosa kara no Kayosei Model Gosei Hoshiki", Dai 73 Kai Proceedings of the National Meeting of Information Processing Society of Japan, Mar. 2, 2011, vol. 2011, No. 1, pp. 263-265. Concise English language explanation provided in ISR.

International Search Report for PCT Application No. PCT/JP2012/005208 mailed on Sep. 25, 2012.

* cited by examiner

FIG. 3                                                                                       110

| CONSTITUENT ELEMENT BEING A RISK FACTOR | | TARGET CONSTITUENT ELEMENT OF AN INFLUENCE | |
| --- | --- | --- | --- |
| TYPE | IDENTIFIER | TYPE | IDENTIFIER |
| POWER SUPPLY | D1 | PHYSICAL SERVER | B1, B2 |
| | | ROUTER | R1 |
| PHYSICAL SERVER | B1 | HYPERVISOR | H1 |
| | | VIRTUAL SERVER | K1, K2 |
| | B2 | VIRTUAL SERVER | K3, K4, K5, K6 |
| ROUTER | R1 | VIRTUAL SERVER | K3, K4, K5, K6 |
| HYPERVISOR | H1 | VIRTUAL SERVER | K1, K2, K3, K4, K5, K6 |

FIG. 4
                                                                    120

| CONSTITUENT ELEMENT BEING A RISK FACTOR | TARGET CONSTITUENT ELEMENT OF AN INFLUENCE | OPERATION → STOP | | STOP → OPERATION | |
|---|---|---|---|---|---|
| | | CONDITIONS | INFLUENCE CONTENTS | CONDITIONS | INFLUENCE CONTENTS |
| D (POWER SUPPLY) | B (PHYSICAL SERVER) R (ROUTER) | STOP STATE | COMPULSORY TRANSITION | OPERATION STATE | CAPABLE OF TRANSITION |
| B (PHYSICAL SERVER) | K (VIRTUAL SERVER) H (HYPERVISOR) | STOP STATE | COMPULSORY TRANSITION | OPERATION STATE | CAPABLE OF TRANSITION |
| R (ROUTER) | K (VIRTUAL SERVER) | NONE | | OPERATION STATE | CAPABLE OF TRANSITION |
| H (HYPERVISOR) | K (VIRTUAL SERVER) | NONE | | OPERATION STATE | CAPABLE OF TRANSITION |

140

INFORMATION PROCESSING DEVICE, INFORMATION PROCESSING METHOD, AND PROGRAM

This application is a National Stage Entry of PCT/JP2012/005208 filed Aug. 20, 2012, which claims priority from Japanese Patent Application 2011-187453 filed Aug. 30, 2011, the contents of all of which are incorporated herein by reference, in their entirety.

TECHNICAL FIELD

The present invention relates to an information processing device that generates a model for predicting the availability of an information processing system, an information processing method, and a program.

BACKGROUND ART

It is important to ascertain the availability of an information processing system in managing the information processing system. A technique involved in the availability of the information processing system is disclosed in Patent Documents 1 to 6.

Patent Document 1 discloses a method of predicting the availability of the whole information processing system by using information indicating characteristics of individual computers constituting the information processing system (for example, rate at which failures occur and time to restore the system from failures), and by using monitoring information indicating the presence or absence of a failure.

Patent Document 2 discloses the following method. First, a fault tree for determining failures is synthesized from system configuration information of each of software and hardware. Subsequently, a failure rate is calculated from the fault tree. Next, it is determined whether or not the calculated failure rate meets a reference value.

Patent Document 3 discloses the following method. First, information regarding availability, functions, configuration, security, performances, and the like are registered as meta data during installation of an application program and an application service. The meta data is used in analysis for subsequent configuration management, failure detection, diagnosis, restoration, and the like.

Patent Document 4 discloses the following method. First, whenever a failure occurs, time for which the failure continues and the number of users who could not use a service due to the failure are stored. These data are accumulated, thereby estimating a failure time rate, a rate at which each user undergoes a failure, availability, and the like.

Patent Document 5 discloses the following method. First, a correlation function of first performance time series information indicating a time series variation in the performance information of a first element and second performance time series information indicating a time series variation in the performance information of a second element are calculated. Next, correlation models are generated using the correlation function. The correlation models are obtained with respect to each combination of apparatuses constituting an information processing system. Subsequently, an optimal correlation model is determined by sequentially searching these correlation models. The performance information of the second element is obtained from the performance information of the first element using the determined correlation model.

Patent Document 6 discloses the following method. First, an operation model of constituent elements of an information processing system is stored. A system operation is simulated using the operation model. An occurrence time of a failure and a restoration time from the failure are determined using this simulation. The availability of the information processing system is determined on the basis of the occurrence time and the restoration time of the failure.

RELATED DOCUMENT

Patent Document

[Patent Document 1] PCT Japanese Translation Patent Publication No. 2008-532170
[Patent Document 2] Japanese Unexamined Patent Publication No. 2006-127464
[Patent Document 3] PCT Japanese Translation Patent Publication No. 2007-509404
[Patent Document 4] Japanese Unexamined Patent Publication No. 2005-080104
[Patent Document 5] Japanese Unexamined Patent Publication No. 2009-199534
[Patent Document 6] Japanese Unexamined Patent Publication No. 2011-22774

DISCLOSURE OF THE INVENTION

Even if a model for predicting availability is constructed with respect to a certain information processing system, when an information processing system and a basic model are updated, there is also a need to update the constructed model. For this reason, it takes effort to maintain the model for predicting availability.

An exemplary object of the present invention is to provide an information processing device, an information processing method, and a program that are capable of generating a model for predicting the availability of an information processing system and of performing maintenance with less effort.

According to the present invention, an information processing device is provided, and the information processing device comprising: a configuration storage unit that stores constituent element identification information for specifying a plurality of constituent elements included in an information processing system, in association with type information indicating types of each of constituent elements, and in association with the constituent element identification information of another constituent element related to the constituent element and the type information of the another constituent element; a rule storage unit that stores, for each piece of the type information, the type information of the another constituent element, which element is influenced when failures occur in the constituent element corresponding to the type information, in association with influence information indicating a content of the influence; and an availability prediction model generation unit that generates an availability prediction model for predicting availability of the information processing system, on the basis of information stored in the configuration storage unit and information stored in the rule storage unit.

According to the present invention, an information processing method is provided, and the information processing method comprising:

preparing a configuration storage unit that stores constituent element identification information for specifying a plurality of constituent elements included in an information processing system, in association with type information indicating types of each of the constituent elements, and in association with the constituent element identification information of another constituent element related to the constituent element and the type information of the another constituent element; and a rule storage unit that stores, for each piece of the type information, the type information of the another constituent element, which element is influenced when failures occur in the constituent element corresponding to the type information, in association with influence information indicating a content of the influence; and causing a computer to generate an availability prediction model for predicting availability of the information processing system, on the basis of information stored in the configuration storage unit and information stored in the rule storage unit.

According to the present invention, a program is provided, and the program causes a computer to function as an apparatus that generates an availability prediction model for predicting availability of an information processing system. The program causes the computer to execute: a function of accessing a configuration storage unit that stores constituent element identification information for specifying a plurality of constituent elements included in an information processing system, in association with type information indicating types of the constituent elements, and in association with the constituent element identification information of another constituent element related to the constituent element and the type information of the another constituent element; a function of accessing a rule storage unit that stores, for each piece of the type information, the type information of the another constituent element, which is influenced when failures occur in the constituent element corresponding to the type information, in association with influence information indicating a content of the influence; and a function of generating an availability prediction model that generates an availability prediction model for predicting availability of the information processing system, on the basis of information stored in the configuration storage unit and information stored in the rule storage unit.

According to the present invention, it is possible to generate a model for predicting the availability of an information processing system and to perform maintenance with less effort.

BRIEF DESCRIPTION OF THE DRAWINGS

The above-described objects, other objects, features and advantages will be further apparent from preferred embodiments described below, and the accompanying drawings as follows.

FIG. 3 is a diagram illustrating an example of a data configuration of a configuration storage unit in the form of a table.

FIG. 4 is a diagram illustrating an example of a data configuration of a rule storage unit in the form of a table.

EXEMPLARY EMBODIMENT

Figure 1:
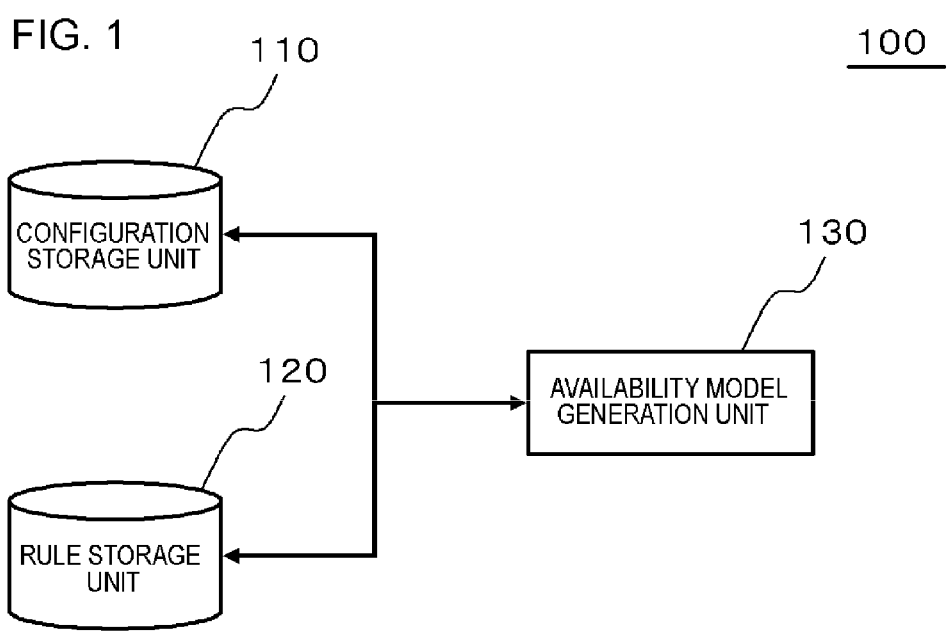
FIG. 1 is a block diagram illustrating a functional configuration of an information processing device according to a first exemplary embodiment.

Hereinafter, the exemplary embodiments of the present invention will be described with reference to the accompanying drawings. In all the drawings, the same elements are referenced by the same reference numerals and descriptions thereof will not be repeated.

(First Exemplary Embodiment)

FIG. 1 is a block diagram illustrating a functional configuration of an information processing device 100 according to a first exemplary embodiment. The information processing device 100 calculates an availability prediction model for predicting the availability of an information processing system 200 (see FIG. 2). The information processing system 200 is constituted by a plurality of constituent elements (physical server, virtual server, router, and the like). The information processing device 100 has a configuration storage unit 110, a rule storage unit 120, and an availability model generation unit 130.

The configuration storage unit 110 stores the constituent element identification information of each constituent element, in association with the type information indicating the type of the constituent element, the constituent element identification information of another constituent element related to the constituent element, and the type information of the another constituent element.

For each piece of the type information, the rule storage unit 120 stores the type information of the another constituent element, which is influenced when failures occur in the constituent element corresponding to the type information, in association with influence information indicating a content of the influence.

The availability model generation unit 130 generates an availability prediction model for the information processing system 200, on the basis of the information stored in the configuration storage unit 110 and the information stored in the rule storage unit 120.

Figure 2:
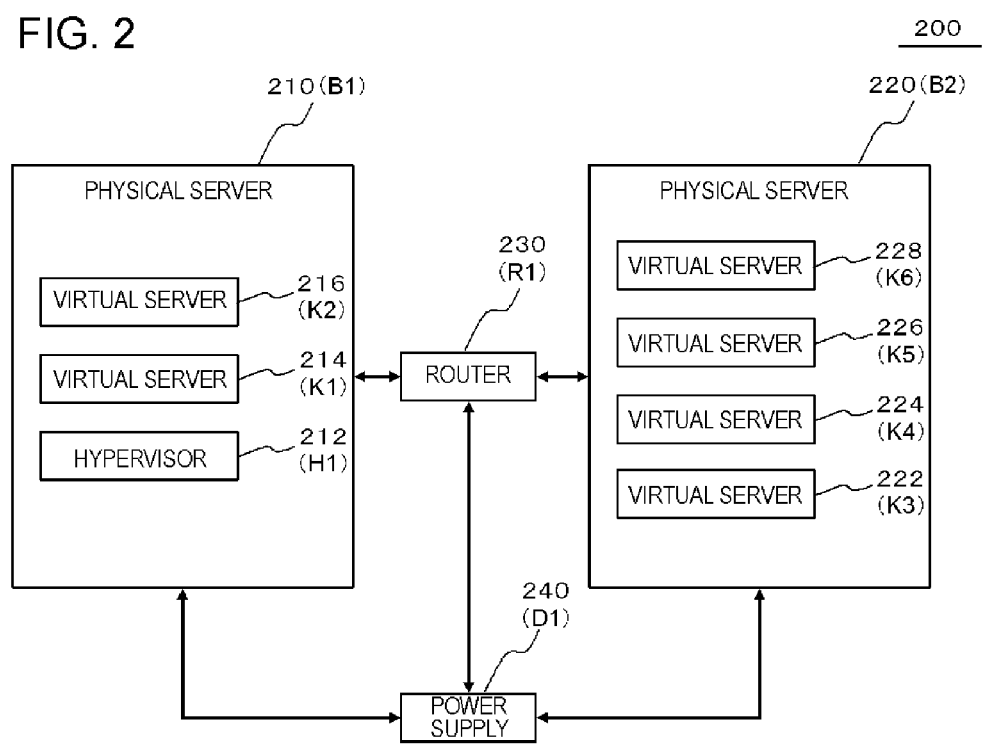
FIG. 2 is a diagram illustrating an example of the configuration of an information processing system.

FIG. 2 is a diagram illustrating an example of the configuration of the information processing system 200. For example, the information processing system 200 is a system for implementing a cloud computing. The information processing system 200 has a plurality of physical servers (in the drawing, indicating physical servers 210 and 220), at least one router 230, and at least one power supply 240. A hypervisor 212 operates and a plurality of virtual servers (in the drawing, indicating virtual servers 214 and 216) are generated within the physical server 210. A plurality of virtual servers (in the drawing, indicating virtual servers 222, 224, 226, and 228) are generated within the physical server 220. The physical server 210 and the physical server 220 are connected to each other through the router 230. In addition, the power supply 240 supplies power to the physical servers 210 and 220 and the router 230.

An identifier "B1" is assigned to the physical server 210, and an identifier "B2" is assigned to the physical server 220. An identifier "R1" is assigned to the router 230, and an identifier "D1" is assigned to the power supply 240. An identifier "H1" is assigned to the hypervisor 212. In addition, identifiers "K1", "K2", "K3", "K4", "K5", and "K6" are assigned to the virtual servers 214, 216, 222, 224, 226, and 228, respectively. Note that, in the exemplary embodiment, the identifier includes type information (R, D, H, K).

Note that, the information processing system 200 may be a physical network system or a virtual network system. As illustrated in FIG. 2, the information processing system 200 may be a combination of a physical system and a virtual system.

FIG. 3 is a diagram illustrating an example of a data configuration of the configuration storage unit 110 in the form of a table. In the example shown in the drawing, the configuration storage unit 110 stores the constituent element identification information of the constituent element being a risk factor (in FIG. 3, referred to as "identifier"), in association with an identifier of a constituent element influenced by the constituent element (in FIG. 3, referred to as "target constituent element of an influence"). As described above, the identifier includes type information. For this reason, for both the constituent element being a risk factor and the target constituent element for the influence, the configuration storage unit 110 also stores the type information.

In the example shown in FIG. 2, the power supply 240 (D1) supplies power to the physical servers 210 (B1) and 220 (B2) and the router 230 (R1). Thus, in FIG. 3, the constituent element "D1" being a risk factor is associated with "B1", "B2", and "R1" which are the target constituent elements of the influence.

FIG. 4 is a diagram illustrating an example of a data configuration of the rule storage unit 120 in the form of a table. In the example shown in the drawing, the rule storage unit 120 stores the type information of the constituent element being a risk factor, in association with the type information of a constituent element that is influenced when failures occur in the constituent element corresponding to the type information (in Table 4, referred to as "target constituent element of influence") and influence information indicating a content of the influence. In the example shown in the drawing, the influence information includes a condition for a state transition of the target constituent element of the influence and the content of the transition at that time (whether the transition is compulsory or optional (that is, whether the probability of the transition is 100% or not)). Specifically, the influence information is a condition for causing the target constituent element of the object to make a transition from an operation state to a stop state, and is a condition for causing the target constituent element of the influence to start an operation from a stop state. The condition herein is an operational state of the constituent element being a risk factor (whether it is in an operation state or a stop state).

For example, when the power supply is stopped, both the physical server and the router are forced to be a stop state (in FIG. 4, referred to as compulsory transition). On the contrary, while the power supply operates, both the physical server and the router can start an operation from the stop state (In FIG. 4, referred to as capable of transition).

Note that, each constituent element of the information processing device 100 indicates a function-based block instead of a hardware-based configuration. Each constituent element of the information processing device 100 is implemented with an arbitrary combination of hardware and software based on a CPU, a memory, a program for implementing the constituent elements of the drawing which are loaded in the memory, a storage unit such as a hard disk that stores the program, and an interface for network connection. The implementing method and apparatus thereof can be modified in various ways.

Next, a process performed by the availability model generation unit 130 will be described. First, the availability model generation unit 130 reads out the information stored in the configuration storage unit 110. In addition, the availability model generation unit 130 temporarily stores the constituent element identification information of each constituent element of the information processing system 200. In the exemplary embodiment, as described above, the constituent element identification information includes type information.

From the rule storage unit 120, the availability model generation unit 130 reads the type information of a constituent element, which is influenced when failures occur in the constituent element corresponding to the type information read out from the configuration storage unit 110, and influence information. The availability model generation unit 130 applies the information read out from the rule storage unit 120 to information read out from the rule storage unit 120 (combination of constituent element being a risk factor with a target constituent element of the influence), thereby generating an availability prediction model for the information processing system 200.

Next, operations and effects of the exemplary embodiment will be described. In the exemplary embodiment, the configuration storage unit 110 stores a combination of the information regarding the system configuration of the information processing system 200, which is, for example, the constituent element being a risk factor, with a target constituent element of the influence. For this reason, when the system configuration of the information processing system 200 is updated, the configuration storage unit 110 may be updated without changing the rule storage unit 120. In addition, the rule storage unit 120 stores information indicating how a certain type of constituent element influences to what type of constituent element. Thus, when a rule indicating the influence of the constituent elements on each other is updated, the rule storage unit 120 may be updated without changing the configuration storage unit 110. Therefore, it is possible to generate the availability prediction model for the information processing system 200 and to maintain the information processing device 100 with less effort.

(Second Exemplary Embodiment)

Figure 5:
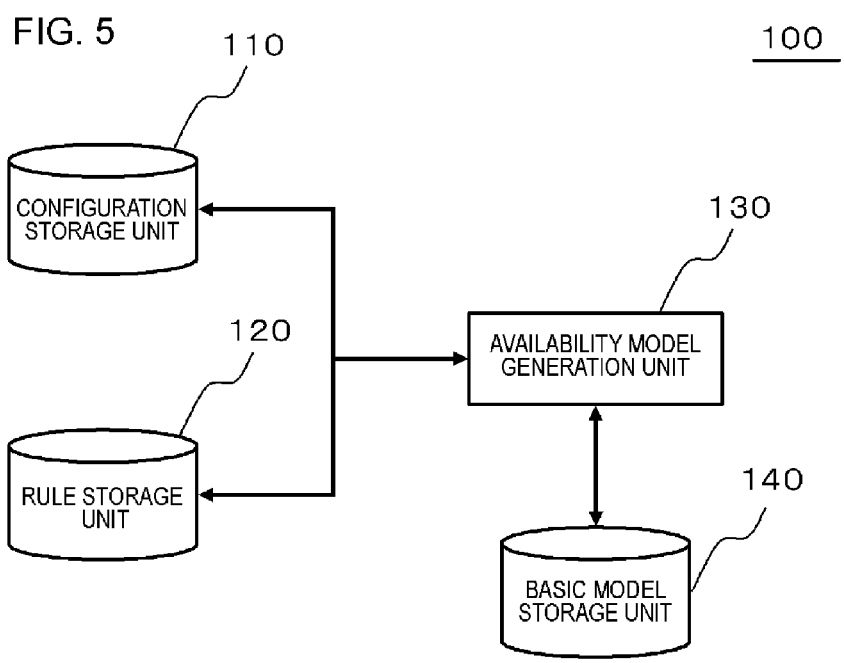
FIG. 5 is a block diagram illustrating a functional configuration of an information processing device according to a second exemplary embodiment.

FIG. 5 is a block diagram illustrating a functional configuration of an information processing device 100 according to a second exemplary embodiment. The information processing device 100 according to the exemplary embodiment is different from the information processing device 100 according to the first exemplary embodiment in that the information processing device 100 according to the exemplary embodiment includes a basic model storage unit 140.

The basic model storage unit 140 stores a basic model for each piece of type information indicating the type of constituent element. The basic model includes the probability of the transition of the constituent element from a stop state to an operation state, and the probability of the transition of the constituent element from an operation state to a stop state.

The availability model generation unit 130 generates an availability prediction model using the basic model stored in the basic model storage unit 140. Specifically, the availability model generation unit 130 reads out, from the configuration storage unit 110, the type information of each of a plurality of constituent elements included in the information processing system 200. The availability model generation unit 130 refers the rule storage unit 120, and reads the type information of another constituent element corresponding to each piece of the type information read from the configuration storage unit 110 in association with influence information. In addition, the availability model generation unit 130 reads out, from the basic model storage unit 140, the basic model corresponding to the type information read out from the configuration storage unit 110. The availability model generation unit 130 corrects the basic model read out from the basic model storage unit 140, using the influence information corresponding to the type information of the basic model in the influence information read out from the availability model generation unit 130, and generates an availability prediction model by using the basic model after the correction.

Figure 6:
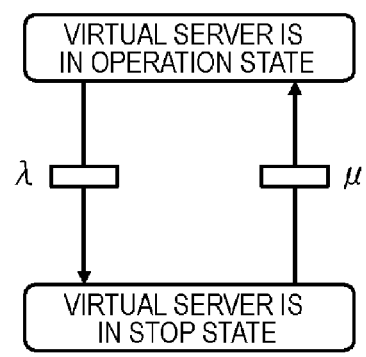
FIG. 6 is a schematic diagram illustrating an example of a basic model stored in a basic model storage unit.

FIG. 6 is a schematic diagram illustrating an example of the basic model stored in the basic model storage unit 140. The basic model shown in the drawing corresponds to a virtual server. The basic model includes probability A of the virtual server transitioning from an operation state to a stop state and probability μ of the virtual server starting to operate from a stop state.

Note that, with respect to other constituent elements (physical server, router, hypervisor, power supply, and the like), the basic models have similar structures.

Figure 7:
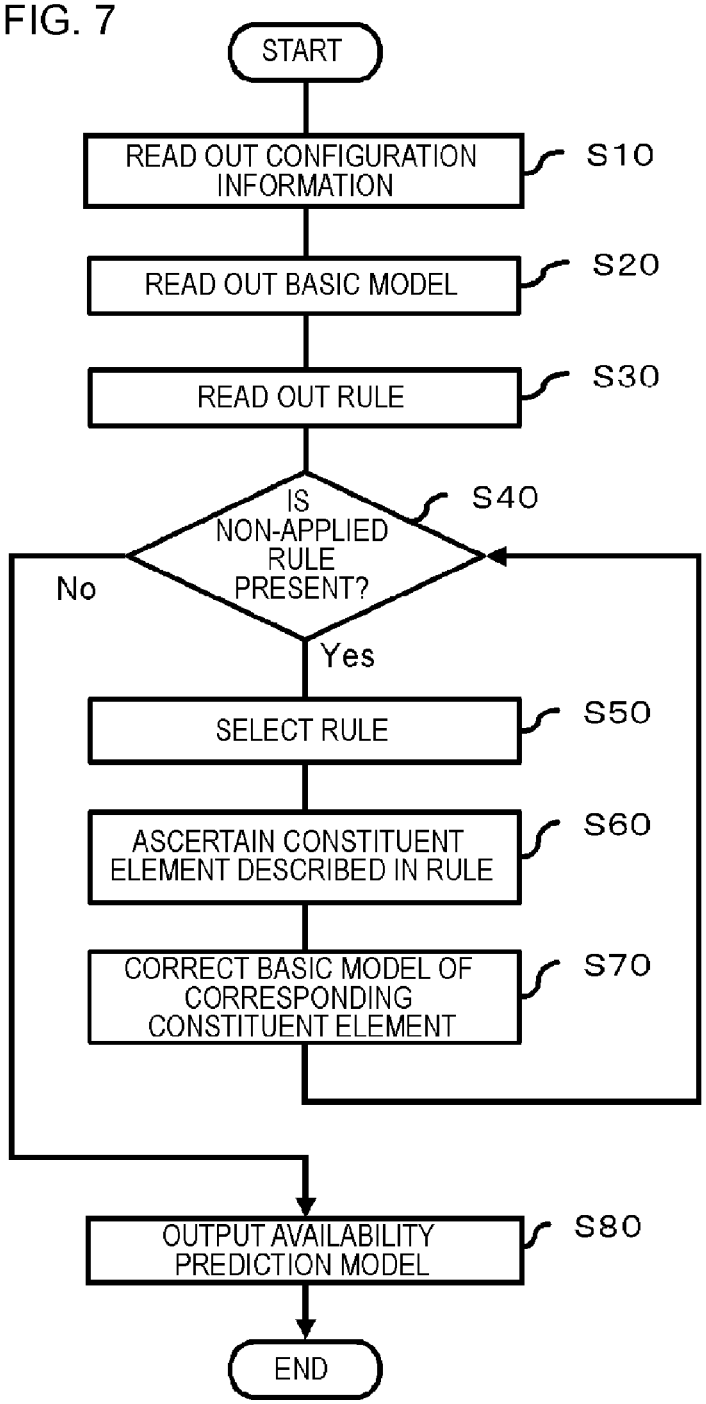
FIG. 7 is a flowchart illustrating a process performed by an availability model generation unit of the information processing device.

FIG. 7 is a flowchart illustrating a process performed by the availability model generation unit 130 of the information processing device 100. First, the availability model generation unit 130 reads out the information stored in the configuration storage unit 110. At this time, the availability model generation unit 130 temporarily stores the constituent element identification information of each constituent element of the information processing system 200. In the exemplary embodiment, as described above, the constituent element identification information includes type information (step S10).

Then, availability model generation unit 130 reads out, from the basic model storage unit 140, the basic model corresponding to the type information read out from the configuration storage unit 110 (step S20).

Then, availability model generation unit 130 reads out information from the rule storage unit 120. The read information is a combination of the type information read out from the configuration storage unit 110 (that is, type information indicating constituent element being a risk factor), the type information of a constituent element that is influenced when failures occur in the constituent element corresponding to the type information (that is, type information indicating a target constituent element of the influence), and influence information. The availability model generation unit 130 reads out the combinations with respect to each of type information read out from the configuration storage unit 110, and recognizes the combinations as rules for determining availability (step S30).

After that, the availability model generation unit 130 selects one of the rules recognized in step S30 (step S50). The availability model generation unit 130 recognizes, from the type information described in the selected rule, a constituent element being a risk factor, and a target constituent element of the influence (step S60). The availability model generation unit 130 corrects a basic model corresponding to the target constituent element of the influence by using influence information included in the selected rule (step S70).

The availability model generation unit 130 performs the processes shown in step S50 to step S70 with respect to all the rules recognized in step S30 (step S40). Thereafter, the availability model generation unit 130 applies the basic model after the correction to each constituent element of the information processing system 200, thereby generating and outputting the availability prediction model for the information processing system 200 (step S80).

Figure 8:
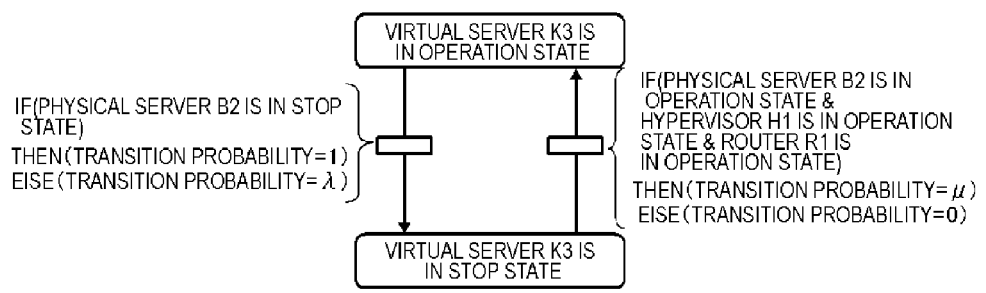
FIG. 8 is a diagram illustrating a basic model of a virtual server (identifier is K3) after correction in step S70.

FIG. 8 is a diagram illustrating a basic model of the virtual server 222 (identifier is K3) after the correction in step S70. The model shown in the drawing indicates the following.

When the physical server 220 (identifier is B2) stops, the virtual server 222 which is in an operation state stops with transition probability of 1. In addition, in other cases, the virtual server 222 transitions from an operation state to a stop state with transition probability of λ.

In addition, when the physical server 220 is in an operation state, when the hypervisor 212 (identifier is H1) is in an operation state, and when the router 230 (identifier is R1) is in an operation state, the virtual server 222 starts to operate with transition probability of p. The probability of the virtual server 222 starting to operate is 0 in other cases, that is, when any one of the physical server 220, the hypervisor 212, and the router 230 is in a stop state.

Figure 9:
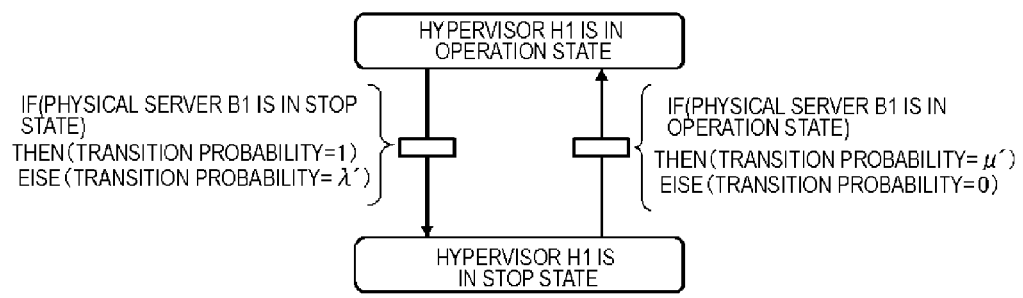
FIG. 9 is a diagram illustrating a basic model of a hypervisor (identifier is H1) after the correction in step S70.

FIG. 9 is a diagram illustrating a basic model of the hypervisor 212 (identifier is H1) after the correction in step S70. The model shown in the drawing indicates the following.

When the physical server 210 (identifier is B1) stops, the hypervisor 212 which is in an operation state stops with transition probability of 1. In addition, in other cases, the hypervisor 212 transitions from an operation state to a stop state with transition probability of λ'.

In addition, when the physical server 210 is in an operation state, the hypervisor 212 starts to operate with transition probability of μ'. The probability of the hypervisor 212 starting to operate is 0 in other cases, that is, when the physical server 210 is in a stop state.

Figure 10:
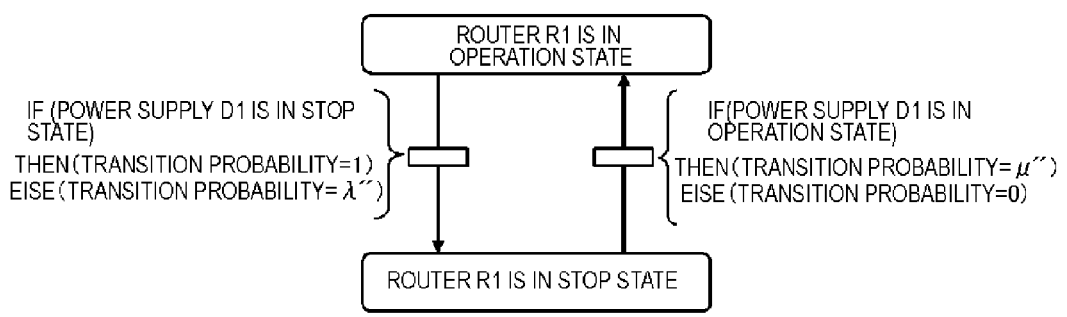
FIG. 10 is a diagram illustrating a basic model of a router (identifier is R1) after the correction in step S70.

FIG. 10 is a diagram illustrating a basic model of the router 230 (identifier is R1) after the correction in step S70. The model shown in the drawing indicates the following.

When the power supply 240 (identifier is D1) stops, the router 230 which is in an operation state stops with transition probability of 1. In addition, in other cases, the power supply 240 transitions from an operation state to a stop state with transition probability of λ".

In addition, the router 230 starts to operate with transition probability of μ" when the power supply 240 is in an operation state. The probability of the router 230 starting to operate is 0 in other cases, that is, when the power supply 240 is in a stop state.

The same effects as in the first exemplary embodiment can also be obtained by the exemplary embodiment. In addition, the information processing device 100 stores the basic model separately from the system configuration of the information processing system 200 and a rule for determining availability. For this reason, when the basic model is updated, there is no need to consider the system configuration of the information processing system 200 and the rule for determining availability. Therefore, it is possible to perform the maintenance of the information processing device 100 with less effort.

(Third Exemplary Embodiment)

Figure 11:
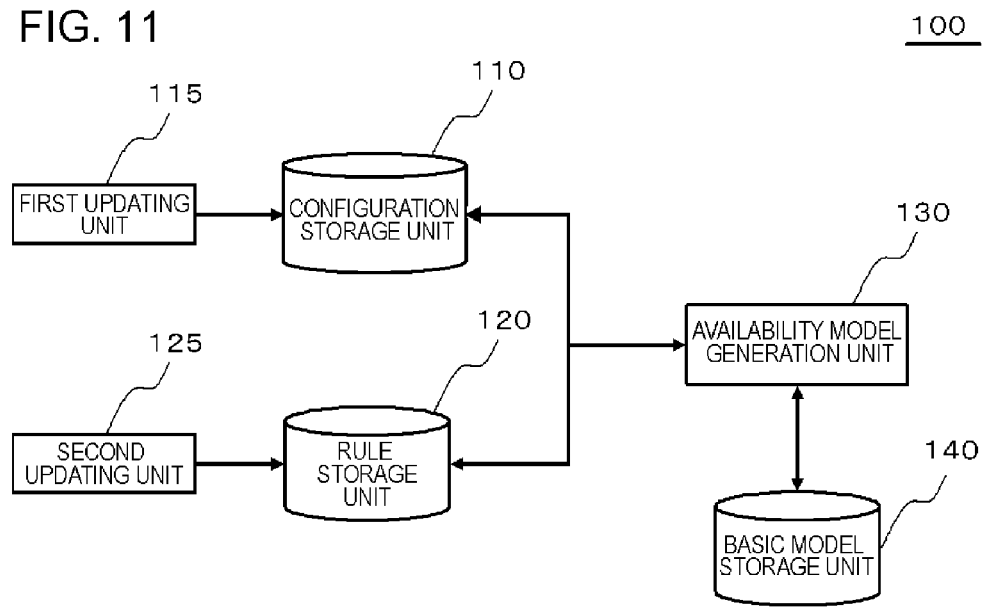
FIG. 11 is a block diagram illustrating a functional configuration of an information processing device according to a third exemplary embodiment.

FIG. 11 is a block diagram illustrating a functional configuration of an information processing device 100 according to a third exemplary embodiment. The information processing device 100 according to the exemplary embodiment has the same configuration as the information processing device 100 according to the second exemplary embodiment except that the information processing device 100 according to the exemplary embodiment includes a first updating unit 115 and a second updating unit 125.

The first updating unit 115 updates information stored in the configuration storage unit 110 in accordance with an input from the outside. The second updating unit 125 updates information stored in the rule storage unit 120 according to an input from the outside.

The same effects as the second exemplary embodiment can also be obtained by the exemplary embodiment. In addition, it is possible to easily update the configuration storage unit 110 and the rule storage unit 120.

In addition, according to the exemplary embodiment, the following invention is also disclosed.

(Addition 1)

An information processing device including:

a configuration storage unit that stores constituent element identification information for specifying a plurality of constituent elements included in an information processing system, in association with type information indicating types of each of constituent elements, and in association with the constituent element identification information of another constituent element related to the constituent element and the type information of the another constituent element;

a rule storage unit that stores, for each piece of the type information, the type information of another constituent element, which element is influenced when failures occur in the constituent element corresponding to the type information, in association with influence information indicating a content of the influence; and an availability prediction model generation unit that generates an availability prediction model for predicting availability of the information processing system, on the basis of information stored in the configuration storage unit and information stored in the rule storage unit.

(Addition 2)

The information processing device according to Addition 1, wherein the influence information includes a condition for a state transition of another constituent element, and information indicating whether the state transition is compulsory or not.

(Addition 3)

The information processing device according to Addition 2, further including a basic model storage unit that stores, for each piece of the type information, a basic model including probability of a transition of the constituent element corresponding to the type information from a stop state to an operation state and probability of a transition of the constituent element from an operation state to a stop state, wherein the availability prediction model generation unit reads out the type information of each of the plurality of constituent elements from the configuration storage unit, wherein, for each piece of the type information read out from the configuration storage unit, the availability prediction model generation unit reads out, from the rule storage unit, the type information of the another constituent element corresponding to the type information in association with the influence information, wherein the availability prediction model generation unit reads out, from the basic model storage unit, the basic model corresponding to the type information read out from the configuration storage unit, wherein the availability prediction model generation unit corrects the basic model read out from the basic model storage unit, using the influence information corresponding to the type information of the basic model in the influence information read out from the rule storage unit, and wherein the availability prediction model generation unit generates the availability prediction model by using the basic model after the correction.

(Addition 4)

The information processing device according to Addition 3, wherein the condition of the influence information is information indicating whether the constituent element having an influence on another constituent element is in an operation state or a stop state.

(Addition 5)

The information processing device according to any one of Additions 1 to 4, further including a first updating unit that updates the information stored in the configuration storage unit according to an input from the outside.

(Addition 6)

The information processing device according to any one of Additions 1 to 5, further including a second updating unit that updates the information stored in the rule storage unit according to an input from the outside.

(Addition 7)

The information processing device according to any one of Additions 1 to 6, wherein the constituent element includes both a virtual server and a physical server.

(Addition 8)

An information processing method comprising:

preparing a configuration storage unit that stores constituent element identification information for specifying a plurality of constituent elements included in an information processing system, in association with type information indicating types of each of the constituent elements, and in association with the constituent element identification information of another constituent element related to the constituent element and the type information of the another constituent element; and a rule storage unit that stores, for each piece of the type information, the type information of the another constituent element, which element is influenced when failures occur in the constituent element corresponding to the type information, in association with influence information indicating a content of the influence; and causing a computer to generate an availability prediction model for predicting availability of the information processing system, on the basis of information stored in the configuration storage unit and information stored in the rule storage unit.

(Addition 9)

The information processing method according to Addition 8, wherein the influence information includes a condition for a state transition of another constituent element, and information indicating whether the state transition is compulsory or not.

(Addition 10)

The information processing method according to Addition 9, further comprising:

preparing a basic model storage unit that stores, for each piece of the type information, a basic model including probability of a transition of the constituent element corresponding to the type information from a stop state to an operation state and probability of a transition of the constituent element from an operation state to a stop state; and causing a computer to read out the type information of each of the plurality of constituent elements from the configuration storage unit;

causing the computer to read out, from the rule storage unit, the type information of another constituent element corresponding to the type information in association with the influence information with respect to each piece of the type information read out from the configuration storage unit;

causing the computer to read out, from the basic model storage unit, the basic model corresponding to the type information read out from the configuration storage unit;

causing the computer to correct the basic model read out from the basic model storage unit, using the influence information corresponding to the type information of the basic model in the influence information read out from the rule storage unit;

causing the computer to generate the availability prediction model by using the basic model after the correction.

(Addition 11)

The information processing method according to Addition 10, wherein the condition of the influence information is information indicating whether the constituent element having an influence on another constituent element is in an operation state or a stop state.

(Addition 12)

The information processing method according to any one of Additions 8 to 11, in which the computer updates the information stored in the configuration storage unit according to an input from the outside.

(Addition 13)

The information processing method according to any one of Additions 8 to 12, wherein the computer updates the information stored in the rule storage unit according to an input from the outside.

(Addition 14)

The information processing method according to any one of Additions 8 to 13, wherein the constituent element includes both a virtual server and a physical server.

(Addition 15)

A program causing a computer to function as an apparatus that generates an availability prediction model for predicting availability of an information processing system, the program causing the computer to execute:

a function of accessing a configuration storage unit that stores constituent element identification information for specifying a plurality of constituent elements included in an information processing system, in association with type information indicating types of the constituent elements, and in association with the constituent element identification information of another constituent element related to the constituent element and the type information of the another constituent element;

a function of accessing a rule storage unit that stores, for each piece of the type information, the type information of the another constituent element, which element is influenced when failures occur in the constituent element corresponding to the type information, in association with influence information indicating a content of the influence; and a function of generating an availability prediction model for predicting availability of the information processing system, on the basis of information stored in the configuration storage unit and information stored in the rule storage unit.

(Addition 16)

The program according to Addition 15, wherein the influence information includes a condition for a state transition of another constituent element, and information indicating whether the state transition is compulsory or not.

(Addition 17)

The program according to Addition 16, causing the computer to implement a function of accessing a basic model storage unit that stores, for each piece of the type information, a basic model including probability of a transition of the constituent element corresponding to the type information from a stop state to an operation state and probability of a transition of the constituent element transitioning from an operation state to a stop state, wherein the function of generating an availability prediction model including:

reading out the type information of each of the plurality of constituent elements from the configuration storage unit;
reading out, from the rule storage unit, the type information of another constituent element corresponding to the type information in association with the influence information, with respect to each piece of the type information read out from the configuration storage unit;

reading out, from the basic model storage unit, the basic model corresponding to the type information read out from the configuration storage unit; and correcting the basic model readout from the basic model storage unit, using the influence information corresponding to the type information of the basic model in the influence information read out from the rule storage unit, and generating the availability prediction model by using the basic model after the correction.

(Addition 18)

The program according to Addition 17, wherein the condition of the influence information is information indicating whether the constituent element having an influence on another constituent element is in an operation state or a stop state.

(Addition 19)

The program according to any one of Additions 15 to 18, causing the computer to implement a function of updating the information stored in the configuration storage unit according to an input from the outside.

(Addition 20)

The program according to any one of Additions 15 to 19, causing the computer to implement a function of updating the information stored in the rule storage unit according to an input from the outside.

(Addition 21)

The program according to any one of Additions 15 to 20, wherein the constituent element includes both a virtual server and a physical server.

As described above, although the exemplary embodiments of the present invention have been set forth with reference to the drawings, these are merely illustrative of the present invention, and various configurations other than those stated above can be adopted.

The application claims priority to Japanese Patent Application No. 2011-187453 filed on Aug. 30, 2011, the content of which is incorporated herein by reference in its entirety.

What is claimed is:

1. An information processing device comprising:
a configuration storage unit that stores constituent element identification information for specifying a plurality of constituent elements included in an information processing system, in association with type information indicating types of each of constituent elements, and in association with the constituent element identification information of another constituent element related to the constituent element and the type information of the another constituent element;
a rule storage unit that stores, for each piece of the type information, the type information of the another constituent element, which element is influenced when failures occur in the constituent element corresponding to the type information, in association with influence information indicating a content of the influence; and
an availability prediction model generation unit that generates an availability prediction model for predicting availability of the information processing system, on the basis of information stored in the configuration storage unit and information stored in the rule storage unit.

2. The information processing device according to claim 1, wherein the influence information includes a condition for a state transition of the another constituent element, and information indicating whether the state transition is compulsory or not.

3. The information processing device according to claim 2, further comprising a basic model storage unit that stores, for each piece of the type information, a basic model including probability of a transition of the constituent element corresponding to the type information from a stop state to an operation state and probability of a transition of the constituent element from an operation state to a stop state, wherein the availability prediction model generation unit reads out the type information of each of the plurality of constituent elements from the configuration storage unit, wherein, for each piece of the type information read out from the configuration storage unit, the availability prediction model generation unit reads out, from the rule storage unit, the type information of the another constituent element corresponding to the type information in association with the influence information, wherein the availability prediction model generation unit reads out, from the basic model storage unit, the basic model corresponding to the type information read out from the configuration storage unit, wherein the availability prediction model generation unit corrects the basic model read out from the basic model storage unit, using the influence information corresponding to the type information of the basic model in the influence information read out from the rule storage unit, and wherein the availability prediction model generation unit generates the availability prediction model by using the basic model after the correction.

4. The information processing device according to claim 3, wherein the condition of the influence information is information indicating whether the constituent element having an influence on the another constituent element is in an operation state or a stop state.

5. The information processing device according to claim 1, further comprising a first updating unit that updates the information stored in the configuration storage unit according to an input from the outside.

6. The information processing device according to claim 1, further comprising a second updating unit that updates the information stored in the rule storage unit according to an input from the outside.

7. The information processing device according to claim 1, wherein the constituent element includes both a virtual server and a physical server.

8. An information processing method comprising:

preparing a configuration storage unit that stores constituent element identification information for specifying a plurality of constituent elements included in an information processing system, in association with type information indicating types of each of the constituent elements, and in association with the constituent element identification information of another constituent element related to the constituent element and the type information of the another constituent element; and a rule storage unit that stores, for each piece of the type information, the type information of the another constituent element, which element is influenced when failures occur in the constituent element corresponding to the type information, in association with influence information indicating a content of the influence; and causing a computer to generate an availability prediction model for predicting availability of the information processing system, on the basis of information stored in the configuration storage unit and information stored in the rule storage unit.

9. A non-transitory computer readable storage medium that includes a program causing a computer to function as an apparatus that generates an availability prediction model for predicting availability of an information processing system, the program causing the computer to execute:

accessing a configuration storage unit that stores constituent element identification information for specifying a plurality of constituent elements included in an information processing system, in association with type information indicating types of the constituent elements, and in association with the constituent element identification information of another constituent element related to the constituent element and the type information of the another constituent element;

accessing a rule storage unit that stores, for each piece of the type information, the type information of the another constituent element, which element is influenced when failures occur in the constituent element corresponding to the type information, in association with influence information indicating a content of the influence; and generating an availability prediction model that generates an availability prediction model for predicting availability of the information processing system, on the basis of information stored in the configuration storage unit and information stored in the rule storage unit.

* * * * *